United States Patent [19]

Hefner, Jr.

[11] Patent Number: 4,480,077
[45] Date of Patent: Oct. 30, 1984

[54] HEAT RESISTANT VINYL ESTER RESIN COMPOSITION

[75] Inventor: Robert E. Hefner, Jr., Lake Jackson, Tex.

[73] Assignee: The Dow Chemical Company, Midland, Mich.

[21] Appl. No.: 433,573

[22] Filed: Oct. 12, 1982

[51] Int. Cl.³ ............................................. C08L 63/10
[52] U.S. Cl. .................................. 525/530; 525/529; 525/922
[58] Field of Search ...................... 525/530, 529, 922

[56] References Cited

U.S. PATENT DOCUMENTS 4,167,542 9/1979 Nelsen .................................. 525/445
4,310,647 1/1982 Zacharias ........................... 525/530

*Primary Examiner*—Allan M. Lieberman
*Attorney, Agent, or Firm*—B. G. Colley

[57] ABSTRACT

Vinyl ester resin compositions containing a vinyl ester resin, an ethylenically unsaturated monomer, and a dicyclopentadiene ester of an unsaturated polycarboxylic acid are prepared and used to make fibrous laminates. The resin compositions have improved resistance to heat aging and delamination.

8 Claims, No Drawings

HEAT RESISTANT VINYL ESTER RESIN COMPOSITION

BACKGROUND OF THE INVENTION

The present invention relates to curable and cured resin compositions comprising a vinyl ester resin or a mixture of vinyl ester resins, an ethylenically unsaturated monomer, and dicyclopentadiene bis or tris ester of an unsaturated di or tri carboxylic acid.

Vinyl ester resins (VER) are a well known class of resins made from unsaturated carboxylic acids and polyepoxides. Vinyl ester resins are the reaction product of about equivalent amounts of a monounsaturated monocarboxylic acid and a polyepoxide. One class of VER is described in U.S. Pat. No. 3,367,992 where dicarboxylic acid half esters of hydroxyalkyl acrylates or methacrylates are reacted with polyepoxide resins. Bowen in U.S. Pat. Nos. 3,066,112 and 3,179,623 describes the preparation of VER from monocarboxylic acids such as acrylic and methacrylic acid. Bowen also describes alternate methods of preparation wherein a glycidyl methacrylate or acrylate is reacted with the sodium salt of a dihydric phenol such as bisphenol A. VER based on epoxy novolac resins are described in U.S. Pat. No. 3,301,743 to Fekete, et al. Fekete, et al. describe VER where the molecular weight of the polyepoxide is increased by reacting a dicarboxylic acid with the polyepoxide resin as well as acrylic acid, etc. in U.S. Pat. No. 3,256,226. Other difunctional compounds containing a group which is reactive with an epoxide group, such as an amine, mercaptan, and the like, may be utilized in place of the dicarboxylic acid. All of the above-described resins, which contain the characteristic linkage

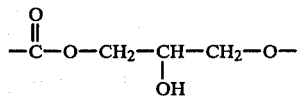

and terminal polymerizable vinylidene groups are classified as VER and are incorporated by reference.

Briefly, any of the known polyepoxides may be employed in the preparation of the vinyl ester resins. Useful polyepoxides are glycidyl polyethers of both polyhydric alcohols and polyhydric phenols, such as the diglycidyl ether of bisphenol A, epoxy novolacs, epoxidized fatty acids or drying oil acids, epoxidized diolefins, epoxidized di-unsaturated acid esters as well as epoxidized unsaturated polyester, so long as they contain more than one oxirane group per molecule. The polyepoxides may be monomeric or polymeric.

Preferred polyepoxides are glycidyl polyethers of polyhydric alcohols or phenols having weights per epoxide group of about 150 to 2000. The polyepoxides may be nuclearly substituted with halogen, preferably bromine. These polyepoxides are usually made by reacting at least about two moles of an epihalohydrin or glycerol dihalohydrin with one mole of the polyhydric alcohol or polyhydric phenol and a sufficient amount of a caustic alkali to combine with the halogen of the halohydrin. The products are characterized by the presence of more than one epoxide group per molecule, i.e., a 1,2-epoxy equivalency greater than one.

VER have many useful properties including excellent mechanical properties and good corrosion resistance to aqueous acids and bases. VER are not, however, without deficiencies. Cured VER and ethylenically unsaturated monomer formulations typically possess poor resistance to heat aging.

Curable compositions consisting of a dicyclopentadiene modified unsaturated polyester, polyesteramide, or mixture thereof; a ethylenically unsaturated monomer or mixture of said monomers; and a dicyclopentadiene bis or tris ester of an unsaturated di or tri carboxylic acid are known from Ser. No. 354,829, filed Mar. 4, 1982.

SUMMARY OF THE INVENTION

It has now been found that thermosetting resin compositions with improved resistance to heat aging and higher heat distortion temperatures can be prepared using a vinyl ester resin or a mixture of vinyl ester resins. The vinyl ester resin is blended with about 95 to 5 weight percent and preferably 25 to 65 weight percent of a mixture of 20 to 80 weight percent of an ethylenically unsaturated monomer and 80 to 20 weight percent of a dicyclopentadiene or polycyclopentadiene bis or tris ester of an unsaturated polycarboxylic acid.

DETAILED DESCRIPTION OF THE INVENTION

Vinyl ester resins are combined with a reactive diluent such as a copolymerizable ethylenically unsaturated monomer, to alter the viscosity of the mixture, to vary the properties of the cured coating, or for other known reasons. Most any vinyl monomer may be employed which is copolymerizable with the unsaturated groups of the mixture. Such monomers include both monovinyl and polyvinyl monomers. Typical monomers include the alkenyl aromatic monomers such as styrene, vinyltoluene, t-butylstyrene, and the like; and alkyl and hydroxyalkyl esters of acrylic and methacrylic acid such as the methyl, ethyl, propyl, butyl, cyclohexyl, and hydroxyethyl esters. In addition to the above, other monomers that are especially useful for ultraviolet light curable systems such as 2-acetoxyalkyl acrylates, pentaerythritol di-, tri-, or tetra-acrylate may be used. The VER, ethylenically unsaturated monomer, and dicyclopentadiene bis or tris ester of an unsaturated di or tri carboxylic acid may be added in any order. Thus, the ethylenically unsaturated monomer or mixture of monomers may be mixed with VER and then added to the dicyclopentadiene bis or tris ester of an unsaturated di or tri carboxylic acid. Alternatively, the VER and dicyclopentadiene bis or tris ester of an unsaturated di or tri carboxylic acid could be mixed first and the monomer added to the resulting mixture. Finally, the VER may be added to a mixture of the monomer and dicyclopentadiene bis or tris ester of an unsaturated di or tri carboxylic acid.

The dicyclopentadiene or polycyclopentadiene bis or tris ester of an unsaturated polycarboxylic acid used in this invention has one of the formulae:

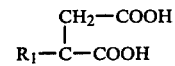

I.

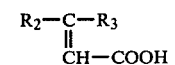

II.

where
$R_1$ is $=CH_2$ or $=C(CH_3)-CH_3$ $R_2$ is hydrogen or $-CH_2-COOH$ $R_3$ is hydrogen when $R_2$ is a $-CH_2-COOH$ group or $-COOH$.

Examples of these esters are the dicyclopentadiene bis or tris esters of maleic, fumaric, itaconic, mesaconic, citraconic, glutaconic, teraconic and aconitic acids.

These esters are known and can be prepared by the methods set forth in U.S. Pat. No. 2,410,425. A specific preparation of one of the fumaric acid esters is set forth below.

Preparation of bis(dicyclopentadienyl)fumarate

Dicyclopentadiene monoalcohol (4.10 moles, 607.66 grams) and tin oxide (SnO) catalyst (0.20 weight percent, 1.68 grams) were added to a stirred reactor maintained under a nitrogen atmosphere and heated to 100° C. Fumaric acid (2.00 moles, 232.14 grams) was added and the stirred slurry was heated to a 180° C. reaction temperature over a 20 minute period with nitrogen sparging (0.5 liter per minute) and the steam condensor was started. After 5 hours of reaction at 180° C., the temperature controller was set at 205° C. and this temperature was achieved 15 minutes later. After 2.75 hours, a total of 66.5 milliliters of water layer and 12.5 milliliters of organic material were collected in the Dean Stark trap. The reactor was cooled to 160° C. and 100 ppm of hydroquinone was added. Bis(dicyclopentadienyl)fumarate in excess of 95 percent purity was recovered as a tacky, pale yellow colored solid. The substitution of polydicyclopentadiene monoalcohol for dicyclopentadiene monoalcohol in this preparation provides bis(polydicyclopentadienyl)fumarate.

The dicyclopentadiene bis or tris ester of an unsaturated polycarboxylic acid is blended to comprise 20 to 80 weight percent of the VER and ethylenically unsaturated monomer mixture.

The final blend is a crosslinkable vinyl ester resin, ethylenically unsaturated monomer, and dicyclopentadiene bis or tris ester of an unsaturated di or tri carboxylic acid which is useful to make laminates, castings, or coatings.

The laminates of this invention are made by mixing, into the crosslinkable composition, free radical forming catalysts in known amounts and adding this mixture to a suitable fibrous reinforcement such as asbestos fibers, carbon fibers, fibrous glass, or inorganic fibers.

Examples of these catalysts are benzoyl peroxide, tertiary butyl hydroperoxide, methylethyl ketone peroxide and the like. It is frequently of value to add accelerators such as cobalt naphthenate, dimethylaniline, and the like.

The resin is rolled, sprayed, or impregnated into the fibrous reinforcement such as fibrous glass and cured in a manner well known in the art. When fibrous glass is used, it can be in any form such as chopped strands, filaments, glass ribbons, glass yarns, or reinforcing mats. The resin may be compounded with solvents, pigments, or other resinous products and cured to form useful coatings in a manner well known in the art.

The vinyl ester resins described below are used herein to illustrate the invention. It is to be understood that similar results are obtained with the other known vinyl ester resins.

Resin A

Bisphenol A is catalytically reacted with a glycidyl polyether of bisphenol A having an EEW of 186-192 (polyether A) at 150° F. under a nitrogen atmosphere for 1 hour to form a polyepoxide having an EEW of 535. After cooling to 110° C., additional diglycidyl ether of bisphenol A (EEW=186-192) is added with methacrylic acid and hydroquinone and reacted to a carboxyl content of about 2-2.5 percent. Then maleic anhydride is added to and reacted with the vinyl ester resin. The final resin, diluted with styrene, has a pH of 7.7 and contains approximately:

| Contents | % |
|---|---|
| bisphenol A | 7.7 |
| diglycidyl ether of bisphenol A (EEW = 186-192) | 36.7 |
| methacrylic acid | 9.15 |
| maleic anhydride | 1.45 |
| styrene | 45 |
| | 100.00 |

Resin B

About 1 equivalent of methacrylic acid is reacted with 0.75 equivalent of an epoxy novolac having an epoxide equivalent weight (EEW) of 175-182 and 0.25 equivalent of a glycidyl polyether of bisphenol A having an EEW of 186-192. The above reactants are heated to 115° C. with catalyst and hydroquinone present until the carboxylic acid content reaches about 1 percent. The reactants are cooled and then styrene (containing 50 ppm of t-butyl catechol) is added. The final resin diluted with styrene has a pH of 7.7 and contains approximately:

| Contents | % |
|---|---|
| styrene | 36 |
| methacrylic acid | 20.6 |
| epoxy novolac (EEW = 175-182) | 32.1 |
| diglycidyl ether of bisphenol A (EEW = 186-192) | 11.3 |
| | 100.00 |

The inventive concept is illustrated in the following embodiments of the invention.

EXAMPLE 1

A portion of bis(dicyclopentadienyl)fumarate and Resin B which has a styrene component and styrene are formulated as follows to provide a 328 gram solution containing the indicated weight percent of each component:

| Resin B (grams[a]/wt %[b]) | bis(Dicyclopentadienyl)fumarate (grams/wt %) | Styrene (grams/wt %)[c] |
|---|---|---|
| 160.0/48.8 | 50.0/15.2 | 118.0/36.0 |

[a]Total Resin B, less styrene.
[b]Active Resin B in formulation.
[c]Total styrene in formulation.

SPI gel and cure times, plus maximum exotherm (84° C.) and the Brookfield viscosity (25° C.) were measured for the formulation. Clear, unfilled castings for use in mechanical property evaluations were prepared. A cure system of 1.0 percent benzoyl peroxide and 0.01 percent N,N-dimethylaniline was used at room temperature. The castings were post-cured 2.0 hours at 100° C. Mechanical properties were determined using an Instron machine and standard test methods (ASTM D-638 and D-790). Heat distortion temperatures (264 psi) were determined using an Aminco machine and standard test methods (ASTM D-648). A series of 8 tensile test pieces, 6 flexural test pieces, and 2 heat distortion temperature test pieces were prepared from each cured casting. All Barcol hardness values are on the 934-1 scale. The results are summarized in Table 1.

CONTROL 1

Resin B (350 grams) which has a styrene component (36.0 weight percent) was used. The physical and mechanical properties were evaluated using the method of Example 1. The results are set forth in Table 1.

TABLE I

|  | Example 1 | Control 1 |
|---|---|---|
| Brookfield viscosity (cp) | 116 | 260 |
| SPI Gel Test |  |  |
| Gel time (min) | 7.0 | 8.0 |
| Cure time (min) | 8.3 | 9.5 |
| Maximum exotherm (°C.) | 197 | 209 |
| Average Barcol Hardness | 46 | 39 |
| Heat Distortion Temperature (°F.) | 228 | 214 |
| Tensile Strength × $10^3$ (psi) | 9.3 | 9.0 |
| Elongation (%) | 2.2 | 2.8 |
| Flexural Strength × $10^3$ (psi) | 18.5 | 19.2 |
| Flexural Modulus × $10^5$ (psi) | 6.6 | 6.4 |

The use of bis(dicyclopentadienyl)fumarate in Example 1 has significantly decreased Brookfield viscosity, gel time, cure time and significantly increased Barcol hardness and heat distortion temperature as compared to Control 1.

EXAMPLES 2 & 3

Portions of bis(dicyclopentadienyl)fumarate and Resin A which has a styrene component and styrene are formulated as follows to provide 382.0 (Example 2) and 391.0 (Example 3) gram solutions containing the indicated weight percent of each component:

| Example | Resin A (grams[a]/wt %[b]) | bis(Dicyclopentadienyl)-fumarate (grams/wt %) | Styrene (grams/wt %)[c] |
|---|---|---|---|
| 2 | 110.0/28.8 | 100.0/26.2 | 172.0/45.0 |
| 3 | 165.0/42.2 | 50.0/12.8 | 176.0/45.0 |

[a]Total Resin A, less styrene.
[b]Active Resin A in formulation.
[c]Total styrene in formulation.

The physical and mechanical properties were evaluated using the method of Example 1. The results are set forth in Table 2.

CONTROL 2

Resin A (350 grams) which has a styrene component (45.0 weight percent) was used. The physical and mechanical properties were evaluated using the method of Example 1. The results are set forth in Table 2.

TABLE 2

|  | Example 2 | Example 3 | Control 2 |
|---|---|---|---|
| Brookfield viscosity (cp) | 80 | 189 | 552 |
| SPI Gel Test |  |  |  |
| Gel time (min) | 7.8 | 6.5 | 8.3 |
| Cure time (min) | 12.4 | 10.1 | 10.7 |
| Maximum exotherm (°C.) | 183 | 214 | 192 |
| Average Barcol Hardness | 36 | 35 | 29 |
| Heat Distortion Temperature (°F.) | 216 | 214 | 198 |
| Tensile Strength × $10^3$ (psi) | 9.5 | 9.9 | 10.6 |
| Elongation (%) | 2.3 | 2.4 | 3.4 |
| Flexural Strength × $10^3$ (psi) | 16.4 | 19.6 | 21.3 |
| Flexural Modulus × $10^5$ (psi) | 6.4 | 6.2 | 5.5 |

The use of bis(dicyclopentadienyl)fumarate in Examples 2 and 3 has significantly decreased Brookfield viscosity and significantly increased Barcol hardness, heat distortion temperature and flexural modulus as compared to Control 2.

EXAMPLE 4

A series of 5.0 by 0.5 by 0.125 inch test pieces were prepared from the clear, unfilled castings of the Controls and the Examples. The test pieces were weighed and placed on a flat aluminum tray which was then suspended in a forced-air, convection-type oven. Further curing at 100° C. for 2.0 hours and then 150° C. for 4.0 hours was completed followed by heat aging at 220° C. for the indicated times as summarized in Table 3. Test pieces were removed at the indicated exposure intervals, weighed, and examined. The weight data was used to calculate the percent weight loss as reported in Table 3.

TABLE 3

| Total Hrs. of Thermal Exposure | Percent Weight Loss | | | | |
|---|---|---|---|---|---|
|  | Example 1 | Control 1 | Example 2 | Example 3 | Control 2 |
| 24 | −1.22 | −1.44[1] | −1.73 | −2.05 | −3.07 |
| 48 | −1.43 | −1.70[1] | −2.01 | −2.49 | −3.96 |
| 96 | −1.80 | −2.18[2] | −2.41 | −3.05 | −5.18 |
| 168 | −2.24 | −2.68[2] | −2.90 | −3.58 | −6.08 |

[1]Surface crazing.
[2]Surface crazing and cracking with peeling of surface resin layer.

The use of bis(dicyclopentadienyl)fumarate in the Examples has significantly decreased the percent weight loss as a function of thermal exposure time when compared to the Controls.

EXAMPLE 5

A series of 5.0 by 0.5 by 0.125 inch heat distortion temperature test pieces were prepared from the clear, unfilled castings of the Examples and the Controls. The test pieces were placed on a flat aluminum tray which was then suspended in a forced-air, convection-type oven. Further curing at 100° C. for 2.0 hours and then 150° C. for 4.0 hours was completed followed by heat aging at 220° C. for the indicated times as summarized in Table 4. The heat distortion temperatures were determined at the indicated intervals using the method of Example 1. The results are reported in Table 4.

TABLE 4

| Total Hrs. of Thermal Exposure | Heat Distortion Temperature (°F.) | | | | |
|---|---|---|---|---|---|
|  | Example 1 | Control 1 | Example 2 | Example 3 | Control 2 |
| 24 | 293 | 300 | 233 | 235 | 230 |
| 48 | 296 | 311 | 237 | 241 | 226 |
| 96 | 293 | 307 | 244 | 246 | 234 |
| 168 | 316 | 313 | 252 | 251 | 235 |
| 288 | 343 | 322 | NA | NA | NA |

The use of bis(dicyclopentadienyl)fumarate in the Examples has significantly increased the heat distortion temperature as a function of thermal exposure time when compared to the controls.

EXAMPLE 6

The formulation of Example 3 (containing 42.2% Resin A, 12.8% bis(dicyclopentadienyl)fumarate and 45.0% styrene) was prepared. This solution was used to prepare a laminate in accordance with the following standard hand layup procedure:

A sheet of 0.005 inch Mylar film was attached to a smooth flat surface with masking tape. An area of sufficient size was covered with a thin coating of the laminating resin and a surface C-veil from the Owens Corning Fiberglass Corporation was laid down and smoothed out. Additional resin was applied and the first layer of 1.5 ounce chopped fiberglass mat having a surface coupling agent was applied. This was carefully rolled down with a serrated aluminum roller to exclude all trapped air. Resin was added, folowed by a second layer of 1.5 ounce chopped fiberglass mat. Rolling again removed any entrapped air. After adding additional resin, the final surface C-veil was applied and smoothed out. Straight steel rails of ⅛ inch square in cross-section were placed along all four sides of the laminate. A cover sheet of Mylar was rolled onto a 2-inch diameter tube long enough to bridge the rails. Additional resin was added to the laminate and the Mylar was rolled out over it. The Mylar was then stretched tightly and taped down. Any entrapped air or excess resin was squeezed out of the laminate using a wooden tongue depressor. The laminate was left until the polymerization exotherm had subsided and cooling to ambient temperature had occurred. The laminate was removed and postcured at 100° C. for 2.0 hours and 150° C. for 1.0 hour.

A cure system of 1.0% methylethylketone peroxide and 0.3% cobalt naphthenate (6.0 percent) was used for the laminate. A series of six standard flexural test pieces were cut from the laminate. Three of the test pieces were weighed and then placed on a flat aluminum tray. The tray was suspended in a vented forced-air convection-type oven maintained at 240° C. The test pieces were removed and weighed after the hours of exposure indicated in Table 5. The remaining three test pieces were used as standards. (No exposure to the 240° C. test temperature). All test pieces were visually inspected during and after removal from the test. Flexural strength and flexural modulus were determined at the zero and 264 hour exposure intervals using the method of Example 1. All Barcol harness values are on the 934-1 scale. Weight loss (percent) was determined by weighing of the test pieces both before and after the indicated thermal exposure. The results are reported in Table 5.

TABLE 5

| | Hours of Exposure to 240° C.* | | | |
|---|---|---|---|---|
| | None | 24 | 168 | 264 |
| Barcol Hardness | 44 | NA | NA | 50 |
| Weight loss (%) | 0 | −2.39 | −3.97 | −4.45 |
| Flexural Strength × 10³ (psi) | 17.3 | NA | NA | 15.1 |
| Flexural Modulus × 10⁵ (psi) | 10.5 | NA | NA | 9.4 |
| Delamination | 0 | none | none | none |

*All samples darken after 4 hours of exposure, otherwise no other visually observable changes occurred at this time.

CONTROL 3

The formulation of Control 2 (containing 55% Resin A and 45.0% styrene) was prepared. Laminate preparation and testing was performed using the method of Example 6. Exposure to the 240° C. test temperature was simultaneous with that of Example 6. The results are reported in Table 6.

TABLE 6

| | Hours of Exposure to 240° C.* | | | |
|---|---|---|---|---|
| | None | 24 | 168 | 264 |
| Barcol Hardness | 46 | NA | NA | 50 |
| Weight loss (%) | 0 | −1.55 | −3.99 | −5.29 |
| Flexural Strength × 10³ (psi) | 11.6 | NA | NA | 12.1 |
| Flexural Modulus × 10⁵ (psi) | 10.1 | NA | NA | 8.0 |
| Delamination | 0 | moderate | severe | severe |

*All samples darken after 4 hours of exposure, otherwise no other visually observable changes occured at this time.

The use of bis(dicyclopentadienyl)fumarate in Example 6 has significantly decreased the percent weight loss as a function of thermal exposure time and totally prevented delamination when compared to Control 3.

I claim:

1. A curable resinous composition comprising
   A. about 5 to about 95 weight percent of a vinyl ester resin having terminal polymerizable vinylidene groups or a mixture of vinyl ester resins, and
   B. about 95 to about 5 weight percent of an unsaturated mixture consisting of 20 to 80 weight percent of an ethylenically unsaturated monomer and 80 to 20 weight percent of a dicyclopentadiene or polycyclopentadiene bis or tris ester of an unsaturated polycarboxylic acid having one of the formulae

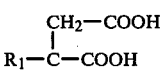

$$\begin{array}{c} CH_2-COOH \\ | \\ R_1-C-COOH \end{array} \qquad I.$$

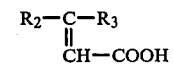

$$\begin{array}{c} R_2-C-R_3 \\ \| \\ CH-COOH \end{array} \qquad II.$$

where
$R_1$ is $=CH_2$ or $=C(CH_3)-CH_3$
$R_2$ is hydrogen or $-CH_2-COOH$
$R_3$ is hydrogen when $R_2$ is a $-CH_2-COOH$ group, or $-COOH$.

2. The composition of claim 1 wherein the bis ester of an unsaturated dicarboxylic acid is bis(dicyclopentadienyl)fumarate.

3. The composition of claim 1 wherein the ethylenically unsaturated monomer is styrene.

4. The composition of claim 1 wherein the vinyl ester resin is the reaction product of bisphenol A, diglycidyl ether of bisphenol A, methacrylic acid, and maleic anhydride.

5. The composition of claim 1 wherein the vinyl ester resin in the reaction product of methacrylic acid, epoxy novolac, and diglycidyl ether of bisphenol A.

6. The composition of claim 1 wherein the vinyl ester resin content is about 35 to about 75 weight percent and the unsaturated mixture content is about 65 to about 25 weight percent.

7. The free radical cured composition of claim 1, 2, 3, 4, 5 or 6.

8. The free radical cured fibrous laminate made with the composition of claim 1, 2, 3, 4, 5 or 6.

* * * * *